UNITED STATES PATENT OFFICE.

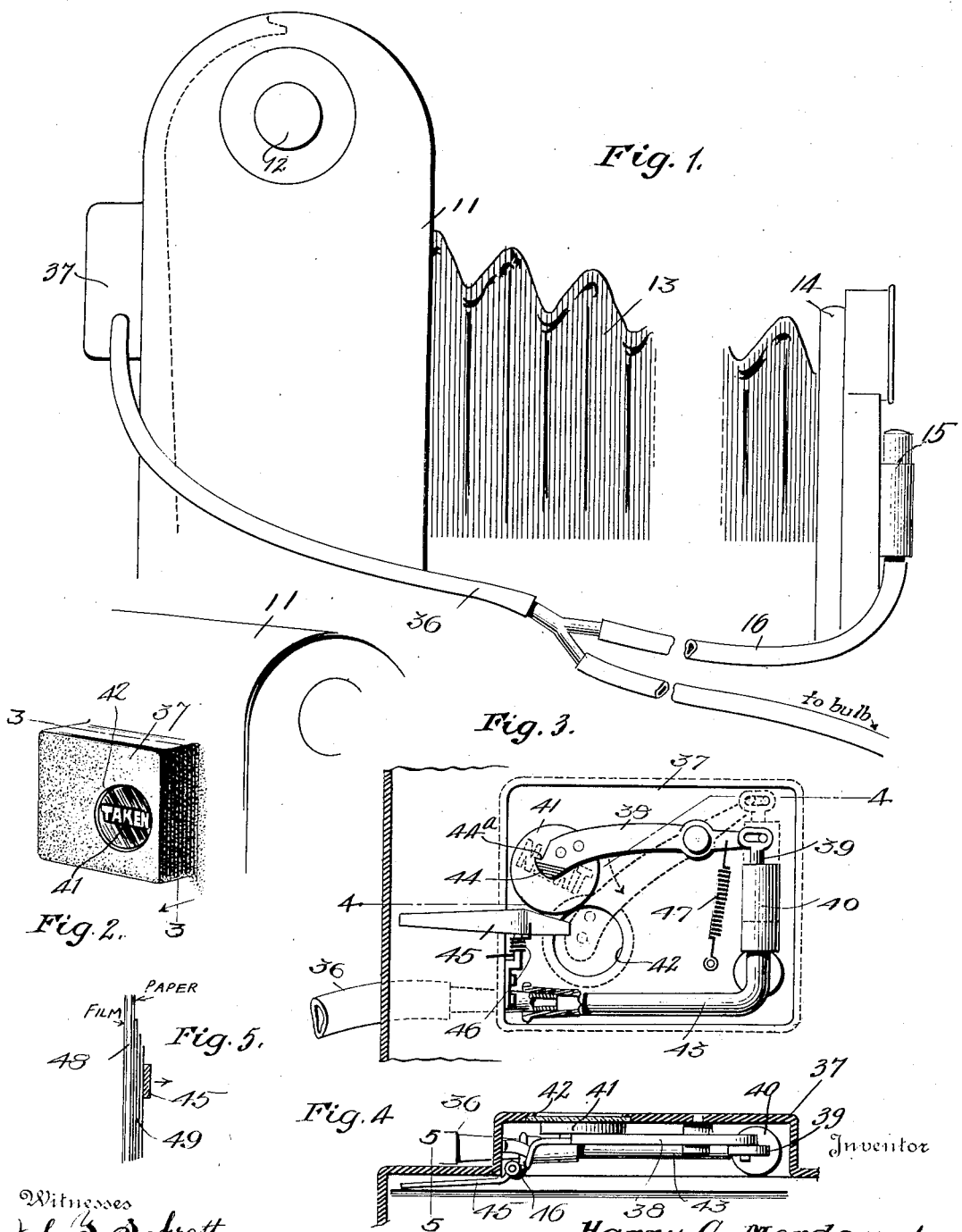

HARRY G. MORDAUNT, OF SALT LAKE CITY, UTAH, ASSIGNOR OF ONE-HALF TO LITTLE GIANT MANUFACTURING & SALES COMPANY, OF OMAHA, NEBRASKA.

FILM-SIGNAL FOR CAMERAS.

1,253,075.  Specification of Letters Patent.  Patented Jan. 8, 1918.

Application filed July 25, 1916, Serial No. 111,124. Renewed December 12, 1917. Serial No. 206,855.

*To all whom it may concern:*

Be it known that I, HARRY G. MORDAUNT, a citizen of the United States, and a resident of Salt Lake City, in the county of Salt Lake and State of Utah, have invented a certain new and useful Improvement in Film-Signals for Cameras, of which the following is a specification.

This invention is an improvement in cameras, and has particular reference to an indicating device therefor.

My object is to provide a device for automatically indicating when a particular portion of a film has been exposed, and when the next succeeding sensitized portion is in position for exposure, such device consisting of a member actuated by air pressure when the shutter mechanism of the camera is operated and carrying suitable indicia visible through the casing of the camera to indicate that an exposure has been made. The air pressure actuated member adjusts a film engaging member into the path of movement of a portion of the film and when contacted by said portion, as the film is wound upon the take up roller, said pressure actuated member is returned to normal position, and suitable indicia on the film are visible through the casing of the camera to indicate that the film is in position for the next exposure.

The inventive idea involved is capable of receiving a variety of mechanical expressions, one of which for the purpose of illustrating the invention, is shown in the accompanying drawings, but it is to be expressly understood that the construction shown in said drawings is used merely for the purpose of illustrating the invention as a whole, and not to define the limits thereof, reference being had to the appended claims for this purpose.

In the accompanying drawings: —

Figure 1 is a side view of a camera, showing a portion of the invention applied thereto;

Fig. 2 is a fragmentary perspective view;

Fig. 3 is a sectional view on the line 3—3 of Fig. 2;

Fig. 4 is a section on the line 4—4 of Fig. 3;

Fig. 5 is a section view of a portion of the film.

Referring now to these figures, I have shown a camera 11 having the usual take-up roll 12, bellows 13, adjustable shutter carriage 14, and shutter operating parts 15, including air connections 16 with a bulb (not shown).

The device for indicating when one exposure has been properly made and when the film is in position for the next succeeding exposure, is preferably connected to the usual air pressure bulb through the medium of the flexible connection 36 secured to the bulb connections 16, and is operated simultaneously with the actuation of the shutter mechanism 15. The indicating device preferably comprises a small casing 37, formed upon the rear wall of the camera casing 11, and has pivoted therein an adjustable member 38, one end of which is connected to a plunger rod 39, mounted in the air chamber 40. The other end of the member 38 has secured thereto, a disk 41 upon which are preferably written suitable indicia, such as the word "Taken," which word is visible through a small opening 42, formed in the casing 37, when the member 38 is adjusted to the dotted line position, as shown in Fig. 3. It will be apparent that air pressure entering the tube 43 from the flexible connection 36 will elevate the plunger or piston rod 39, and thus swing the member 38 about its pivot and lower the disk 41 so that the same will register substantially with the opening 42. The extremity of the pivoted member which carries the disk 31 is preferably beveled as indicated at 44, and this beveled end is provided with a notch 44ª adapted to engage with one end of the pivoted latching element 45 when the member 38 is swung to adjusted position. A spring 46 coiled about the pivot of the latching member 45 will cause that end of said member which engages the beveled end 44 of the member 38 to retain the latter member in its adjusted position until the latching element 45 is released in a manner to be presently described, whereupon the coil spring 47 connected to the member 38 will return the same to its normal position. By reason of the beveled construction of the end 44 of the member 38, the latching element 45 will be swung about its pivot and the end opposite that which engages the beveled end 44 will be projected into the path of movement of a portion of the film 48, as shown in Fig. 5. The film is preferably thickened by means of a number of layers of paper or other material 49, so that when the thickened portion contacts the latching member 45, the same will be moved about its pivot, and release the member 38, so that the same can return to normal position, whereupon the usual numbers on the ordinary film will register with the opening 42, and thus indicate that the film is in position for a new exposure, the thickened portions 49 being of course arranged at regular intervals along the film adjacent each exposed area thereof and secured to the paper backing thereof.

From the foregoing description, it will be understood that after the indicating device has been initially operated to show that an exposure has been properly made, the winding mechanism is actuated to wind the film upon the take up roll 12. Also, that as the film 48 is wound upon said roll, the thickened portion 49 thereof approaches the latching element 45, one end of which is arranged in the path of movement of said thickened portion, and when said element is contacted by the latter, the indicating device is returned to normal position, thus indicating that the succeeding portion of the film has been moved into position for a new exposure.

What is claimed is:—

1. The combination with a camera having a shutter mechanism and air pressure operated means for actuating the same; of an adjustable member operated by said means and carrying indicia visible through an opening in the camera casing to indicate when the shutter mechanism has been operated, a latching element contacting said adjustable member for releasably retaining the same in an adjusted position, said latching element extending into the path of movement of a portion of a film when in latching position and being adapted to be operated by said portion of the film to permit of the return of said adjustable member to normal position.

2. The combination with a camera having a shutter mechanism and air pressure means for operating the same having a film; of a casing, a member pivoted therein, a reciprocating element actuated by said air pressure means and connected to said pivoted member for actuating the same, an indicating element carried by said pivoted member and visible through said casing when said member is actuated, a latching element engaging said pivoted member for retaining the same in adjusted position, and means carried by said film to release said latching element whereby to permit said pivoted member to return to normal position.

3. An attachment for cameras having a movable film and shutter operating means, consisting of a signal, means actuated by the shutter operating means to set the signal, and means to release the signal upon subsequent movement of the film including an element carried by the film.

4. An attachment for cameras having a movable film and shutter operating means, consisting of a signal, means actuated by the shutter operating means to set the signal, and including a latch element and means actuated by the film in its movement to release the signal including an element carried by the film for engaging and releasing said latch member.

HARRY G. MORDAUNT.